US006065119A

United States Patent [19]

Sandford, II et al.

[11] Patent Number: 6,065,119
[45] Date of Patent: May 16, 2000

[54] DATA VALIDATION

[75] Inventors: Maxwell T. Sandford, II; Theodore G. Handel, both of Los Alamos, N.Mex.

[73] Assignee: The Regents of the University of California, Los Alamos, N.Mex.

[21] Appl. No.: 08/865,826

[22] Filed: May 30, 1997

[51] Int. Cl.[7] .................................................. G06F 12/14
[52] U.S. Cl. ........................................................ 713/200
[58] Field of Search ............................. 395/186, 187.01, 395/188.01, 200.59; 380/25, 30

[56] References Cited

U.S. PATENT DOCUMENTS

| | | | |
|---|---|---|---|
| 4,405,829 | 9/1983 | Rivest et al. | 380/30 |
| 4,868,877 | 9/1989 | Fischer | 380/25 |
| 5,204,897 | 4/1993 | Wyman | 380/4 |
| 5,659,726 | 8/1997 | Sandford, II et al. | 395/612 |
| 5,694,569 | 12/1997 | Fisher | 395/186 |
| 5,757,092 | 5/1998 | Graham | 310/15 |
| 5,778,102 | 7/1998 | Sandford, II et al. | 382/251 |
| 5,819,289 | 10/1998 | Sandford, II et al. | 707/104 |

OTHER PUBLICATIONS

Book by B. Schneier, *Applied Cryptography Protocols, Algorithms, and Source Code in C*, J. Wiley & Sons, New York, New York (1994). (Copy of title page, the page containing ISBN information, and that portion of the document that caused it to be listed.).

M. Bellare, R. Canetti, and H. Krawczk, encryption method for authenticating data which is based on a message authentication code (MAC) was presented in "The HMAC Construction," RSA Laboratories' CryptoBytes, 2, No. 1, 12, pp. 12–15 (1996).

W. Bender, D. Gruhl, and N. Morimoto, "Techniques for Data Hiding," Proc. SPIE, Storage and Retrieval for Image and Video Databases III, vol. 2420, pp. 164–173, Feb . 9–10, 1995, San Jose, CA.

Method for impressing a digital watermark by G. Caronni, in "Assuring Ownership Rights for Digital Images," Proc. Reliable IT Systems, VIS' 95, 1995, pp. 1–10, edited by H. H. Bruggemann and W. Gerhardt–Hackl (Vieweg Publ. Co.: Germany).

Another method for impressing a digital watermark by I. J. Cox, J. Kilian, T. Leighton, and T Shamoon in "Secure Spread Spectrum Watermarking for Multimedia," NEC Research Inst. Tech. Report 95–10, pp. 1–33, 1995.

*Primary Examiner*—Robert W. Beausoliel, Jr.
*Assistant Examiner*—Pierre Eddy Elisca
*Attorney, Agent, or Firm*—Milton D. Wyrick

[57] ABSTRACT

A method of authenticating digital data such as measurements made for medical, environmental purposes, or forensic purpose, and destined for archival storage or transmission through communications channels in which corruption or modification in part is possible. Authenticated digital data contain data-metric quantities that can be constructed from the digital data by authorized persons having a digital key. To verify retrieved or received digital data, the data-metrics constructed from the retrieved or received data are compared with similar data-metrics calculated for the retrieved or received digital data. The comparison determines the location and measures the amount of modification or corruption in the retrieved or received digital data.

20 Claims, 24 Drawing Sheets

Code To Generate Sample Data

```
/************************************************************************/
/* MAKEDATA:  This is a program to generate data sets, for testing*/
/*            data authentication class codes.                    */
/* AUTHOR:  M. T. Sandford II, 17 April 1996                      */
/************************************************************************/ include <stdlib.h>
include <stdio.h>
#include <math.h>
include <graphic.h> define MAXVALS 16383
define TWOPI  6.283185
#define NOISE 10            /* percentage of noise to add */
#define SPIKE 30            /* percentage of spikes to add */
define SPIKE_FREQ 5        /* frequency of spikes */ float ftable[MAXVALS];    /* table of float values */
float x[MAXVALS/16];      /* table of abscissa values */
float y[MAXVALS/16];      /* table of ordinal values */ void main(void) {
int i,j;
long bytes;
FILE *tape6;
float ymax,ymin;
float xstp,ystp;
int x_tic_value;
char * x_tic_string[7]; /* pointers to x-tic mark labels */

/* generate data with cosine function */
for(i=0;i<MAXVALS;i++) {
    ftable[i] = (float)cos((double)i*TWOPI/(double)MAXVALS);
    }
tape6 = fopen("testdata.bin","wb");
```

FIG. 5A

```
/* add the white noise */
bytes = 0L;
ymax = -3.0e+38f;
ymin = -ymax;
for(i=0;i<MAXVALS;i++) {
    float amplitude = 0.f;
    amplitude = (1.f -2.f*(float)rand()/(float)RAND_MAX);
    ftable[i] += amplitude*((float)NOISE/100.f)*0.50f;
    if((float)rand()/(float)RAND_MAX <= (float)SPIKE_FREQ/100.f)
        ftable[i] += amplitude*((float)SPIKE/100.f)*ftable[i];
    j = fwrite(&ftable[i],sizeof(float),1,tape6);
    if(ftable[i] > ymax)ymax = ftable[i];
    if(ftable[i] < ymin)ymin = ftable[i];
    bytes += sizeof(float);
    if(i%300==0) {
        printf("\ni, ftable[i]: %d, %f", i, ftable[i]);
            printf(" %ld bytes written", bytes);
            }
    }
fflush(tape6);
fclose(tape6);
}
```

FIG. 5B

Histogram Analysis Implementation Code

```
//****************************************************************
******************************************************
//
//   MakeHistTables:  Routine to analyze histogram and create tables
of cluster values
//
//   ORIGIN:      Code evolved from ReadBMP() routine in the
original DOS demo
//               Modified from the CImageBitmapFile:: class
implementation
//
//   INPUT:       None, uses data from the Histogram() class
member
//   OUTPUT:      sets pointers to *pair and *ctable class members
and fills the structures
//   RETURN:      0, success
//                1, failed
//   AUTHOR:      M. T. Sandford II 4/18/96
//                Copyright(c) 1996, M. T. Sandford II and the Univ. of
California
//****************************************************************
****************************************************** define XRANGE    4   // half-range of histogram intervals to search
in the x-direction
#define YRANGE    10  // percentage for the ordinate range
interval
define MAXFTABLE 256 // maximum size of the cluster tables short check_ftable(short pixval, short ntab, FCLUSTER *ctable);

void CValidate::MakeHistTables(void) {
```

FIG. 10A

```
short i,j,k;                    // loop counters
short error;                    /* error band for pixel values */
short cndx;                     /* index in cluster structure tables */
short pcnt;                     /* index in pair table */
short n;                        /* no. of pairs in a cluster */
short l;                        /* general purpose loop index */
unsigned short ncluster, navg, nx;  /* cluster index */
unsigned short *htable;         // pointer to candidate cluster
values
unsigned long  hist_start;      /* histogram table starting value */
unsigned long  htest;           /* test value in histogram ordinate loop
*/
unsigned long  li, lj;          /* histogram values & indices */
unsigned long  hmax_value= 0;   /* histogram maximum ordinal
value */
unsigned long  hist_stop;       /* histogram table stopping value */
long diff;                      /* histogram difference value */ htable = NULL;
htable = new unsigned short[m_hist_size*sizeof(short)];            //
storage for histogram values
if(ctable==NULL) {
    m_hctable =
GlobalAlloc(GHND,sizeof(FCLUSTER)*MAXFTABLE);           // storage
for the cluster data
    ctable = (FCLUSTER *)GlobalLock(m_hctable);
    }
memset((void *)ctable,0,sizeof(FCLUSTER)*MAXFTABLE);

if(pair==NULL)
    pair  = new PAIRS[MAXPAIRS];              // storage for the
pair data
memset((void *)pair,0,sizeof(PAIRS)*MAXPAIRS);
```

FIG. 10B

```
if(htable==NULL || ctable==NULL || pair==NULL) {
        afxDump << "CValidate:: Histogram table memory allocation error\n";
        if(htable)delete [] htable;
        if(ctable)delete ctable;
        if(pair)  delete pair;
        goto DONE;
        }
total = 0L;
hmax_value = 0L;                              // maximum ordinate value
n = 0;
htest = 0L;
cndx = 0;
pcnt = 0;
no_pairs = 0;

// process histogram to find clusters
for (i=0;i<(short)m_hist_size;i++) {
    unsigned long temp = (unsigned long)m_hist_table[i];
    hmax_value = __max(hmax_value,temp);    // maximum freq. (ordinate) value
    }
hist_stop = hmax_value - hmax_value*YRANGE/100;
for (li=htest;li<hist_stop;li++) {
    j = (short)((li+1L)*(long)YRANGE/100L);
    hist_start = li;
    if(j > (short)htest)break;              /* start where hist error is greater than 1 */
    }
htest = j/2 +1;
```

FIG. 10C

```
for(li = hist_start;li <= hist_stop; li += htest)  {/* step through
histogram ordinate values */
    lj = li*YRANGE/100;
    htest = __max(htest,lj);
    n = 0;
    for (i=0;i<=(short)m_hist_size;i++) {           /* step
through histogram abcissa values */
        diff = m_hist_table[i] - li;
        if(diff < 0)diff = -diff;
         if((unsigned)diff <= htest) {
            htable[i] = i;
            n++;                           // n is the no. of elements in the
htable[]
        }
         else htable[i] = 0;
    }
    if(n <= 2)  continue;              /* need at least 2 values
in ordinate error range */

/*  find & tablulate clusters of degenerate pixel (abcissa) values */
    for (i=XRANGE;i<=(short)m_hist_size;i++) {
        ncluster = 0;
        if(htable[i]) {  /* found a non-zero abcissa value */
            error = 2*XRANGE;
            j = i + error;
            j = __min((unsigned)j,m_hist_size);
            for (k=i;k<j;k++) {
                if(htable[k])ncluster++;  /* tabulate no. of abcissa
values in error range */
            }
        }
        if(!ncluster)continue;
        nx = ncluster;
        if((nx-nx%4) == 4) nx = 4;       // maximum of 4 values for a
floating pt. cluster
```

FIG. 10D

```
        if(nx >= 4) {          /* process htable data as a cluster of
pixel values */
            ctable[cndx].count = 0L;
            ctable[cndx].total = 0;
            ctable[cndx].ncluster = nx;
            if(nx==4) ctable[cndx].total = 2;
            navg = 0;
            lj = (unsigned)nx;
            for(k=i;k<j;k++) {
                if(htable[k]) {
                    if(check_ftable(htable[k],cndx,ctable))continue;
                    nx--;
                    ctable[cndx].values[nx] = htable[k];
                    ctable[cndx].count +=
ctable[cndx].total*m_hist_table[k];
                    navg += htable[k];
                    if(nx == 0) {
                        ncluster = 0;
                        break;
                    }
                }
            }
            if(nx) goto DEUX;    /* if any values left over owing to
duplicates treat the cluster as pairs */
            navg /= (short)lj;
            i = j+1;
            cndx++;
            no_tables = cndx;
            if(cndx == MAXFTABLE) {
                afxDump << "Degeneracy table size exceeded!\n";
                cndx--;
            }
        }
        else {         /* process the htable values for pair-embedding
*/
```

FIG. 10E

```
        DEUX:n = ncluster/2;        /* no. of possible pairs */
            ncluster = 0;
            pcnt = no_pairs;
            if(no_pairs>MAXPAIRS-1) n = 0;
            while(n) {
                for(k=i;k<j;k++) {
                    if(htable[k]) {  /* this test takes out the pairs from
the cluster */
                        pair[pcnt].i = htable[k];
                        for(l=k+1;l<j;l++) {
                            if(htable[l]) {
                                pair[pcnt].j = htable[l];
                                pair[pcnt].count = m_hist_table[k] +
                                m_hist_table[l];
                                pcnt++;
                                n--;
                                i = l+1;
                                k = l;
                                break;
                            }
                        }
                        if(n==0)break;   /* found all the pairs in the
cluster */
                    }
                    if(pcnt==MAXPAIRS)break;
                }
            }
            no_pairs = pcnt;
            if(no_pairs==MAXPAIRS)   // remove duplicates if table fills
                no_pairs = duplicate(no_pairs,pair);
        }
    }  /* i loop end */
    memset(htable,0,sizeof(short)*(m_hist_size));     // zero the
table of candidate cluster values
    } /* li loop */ keysize = 0;                     // initialize length of the pair key
```

FIG. 10F

```
        if(no_pairs) {                    // process the pairs that were
found
            p_sort(pair, no_pairs);       // sort to decreasing frequency
            no_pairs = duplicate (no_pairs, pair);   /* remove zero-count
pairs */
            /* remove pairs overlapping cluster entries */
            for(i=0;i<cndx;i++) {
                for (j=0;j<no_pairs;j++) {    /* check each pair value
against all table values */
                    for(k=0;k<ctable[i].ncluster;k++) {
                        if(pair[j].i == ctable[i].values[k] ||
                            pair[j].j == ctable[i].values[k]) pair[j].count = 0L;
                    }
                }
            }
            no_pairs = duplicate (no_pairs, pair);   /* remove zero-count
pairs */
            for(i=no_pairs;i<MAXPAIRS;i++)
                memset(&pair[i],0,sizeof(PAIRS));
            for(i=0;i<no_pairs;i++)
                total += pair[i].count;       // add the total from pairs for
the plane
            keysize = no_pairs*2*sizeof(short) + sizeof(long);   // pair
bytes + checksum value
        } // end of if(no_pairs)

if(no_tables) {
        for(i=0;i<no_tables;i++) {                //save tables in file
            keysize += ctable[i].ncluster*sizeof(short);
            total += ctable[i].count;
        }
        keysize += sizeof(long);              // cluster bytes + checksum
value
    }
```

FIG. 10G

```
if(m_hist_flag==1) {                /* write out histogram file for
plotting code */
    CFile fhHfile("histplt.bin",CFile::modeCreate|CFile::modeWrite);
    fhHfile.Write(&m_hist_size,sizeof(short));
    fhHfile.Write(m_hist_table,sizeof(m_hist_table)*m_hist_size);
    fhHfile.Write(&no_pairs,sizeof(short));
    fhHfile.Write(pair,sizeof(PAIRS)*no_pairs);
    fhHfile.Write(&no_tables,sizeof(short));
    fhHfile.Write(ctable,sizeof(FCLUSTER)*no_tables);
    fhHfile.Close();                 // file is completed
    }
total /= 8;                          // total no. of bytes for the
image DONE:
if(htable) delete [] htable;
return;
}
```

FIG. 10H

Data Validation Class Definition

```
class CValidate: private CDataFile
{
private:
    short m_Data_Type;              // flag for the type of data to be validated
    short m_hist_flag;              // flag to write a histogram file for plotting
    short no_pairs;                 // number of histogram pairs
    short no_tables;                // number of histogram tables
    short index;                    // index for a fl. pt. data value in the histogram
    unsigned short m_no_values;     // number of data entries in the fl. pt. table
    unsigned short m_hist_size;     // size of the histogram array abcissa
    unsigned short keysize;         // size of the noise key in bytes
    unsigned short *index_table;    // pointer to embedding index tables
    HGLOBAL m_hftable;              // handle to far heap floating pt. data table
    HGLOBAL m_hctable;              // handle to far heap cluster table structure array
    float *m_ftable;                // pointer to fl. pt. data table
    float m_minvalue;               // minimum value of data table
    float m_maxvalue;               // maximum value of data table
    float m_hist_step;              // step size corresponding to one histogram bin interval
    float max_error_percent;        // maximum percentage error introduced by embedding
    long *m_hist_table;             // pointer to histogram table
    unsigned long total;            // total amount of embedding space
    unsigned long maxval;           // the number of bits embedded
    PAIRS *pair;                    // pairs used for embedding
    FCLUSTER *ctable;               // tables used for embedding
```

FIG. 13A

```
// function member declarations
void CValidate::scramble(short no_pairs, PAIRS *pair);

public:
    // function member declarations
      CValidate(short Data_Type=DATA_TYPE_NONE,short
Data_Mode=0, LPSTR lfFname=NULL);
    ~CValidate(void);
    virtual unsigned short MakeFloatTable(LPSTR lpFname);
    void  MakeHistogram(void);
    void  MakeHistTables(void);
    void  EmbedFloatValues(LPSTR lpDataFile, LPSTR lpOutFile);
    short EmbedFloatPairs (float *fvalue, short k, unsigned long
*maxval);
    short EmbedFloatTables(float *fvalue, short cndx, unsigned long
*maxval);
    void  MakeIndexTable(void);
    void  ExtractFloatValues(LPSTR lpKeyFile);
    short ExtractFloatPairs (float *fvalue, short k, unsigned long
*maxval);
    short ExtractFloatTables(float *fvalue, short cndx, unsigned long
*maxval);
    virtual void  CompareHistograms(void);
};
```

FIG. 13B

DATA VALIDATION

FIELD OF THE INVENTION

The present invention generally relates to digital manipulation of numerical data for the intended purpose of providing a means for an authorized person to verify the accuracy and integrity of the information at any time in the future. This invention was made with Government support under Contract No. W-7405-ENG-36 awarded by the U.S. Department of Energy. The Government has certain rights in the invention.

BACKGROUND OF THE INVENTION

The use of data in digital form for all purposes is common throughout the world. Much of this digital data requires a guarantee of the data fidelity. This guarantee means that it would be difficult, or impossible for an unauthorized person to modify the information without detection. Thus, the many kinds of data collected with digital sensors often require validation. Validation provides a secure means for assuring that the data have not been corrupted or modified since their creation.

Commonly used validation methods that leave the data intact are a checksum, a digital signature, or encryption. Discussion of these methods can be found in the book by B. Schneier, *Applied Cryptography Protocols, Algorithms, and Source Code in C*, J. Wiley & Sons, New York, N.Y., 1994. This reference is incorporated herein by reference.

A checksum guarantees the validity of the data insecurely, because an unauthorized person can modify the data, calculate, and append a new checksum value. The checksum value can be encrypted for greater security. Digital signatures ensure that the data are valid, but the signature is unable to provide an indication of the location and extent of any modifications in the original data. Further, any corruption of the checksum or digital signature value itself gives a false indication of data modification.

One encryption method for authenticating data is based on a message authentication code (MAC), a key shared between the parties. M. Bellare, R. Canetti, and H. Krawczyk presented this method in "The HMAC Construction," RSA Laboratories' CryptoBytes, 2, no. 1, 12 (1996). However, encryption renders data unusable to all persons except the authorized users. Encrypted data are unrecognizable as meaningful information and the data are of no use if the validation (decryption) cannot be performed. Encrypted data suffering corruption or modification in the process of storage and retrieval, or in transmission through a communication channel is therefore rendered generally unusable even for an authorized person. Moreover, in certain situations, encryption methods are unacceptable for use because they conceal the data content.

Methods that hide validation information within the data being authenticated offer an alternative means to validate digital data. Digital watermarks can be added to data by methods falling generally into the field of steganography. Steganographic methods are reviewed by W. Bender, D. Gruhl, and N. Morimoto in "Techniques for Data Hiding," Proc. SPIE, Storage and Retrieval for Image and Video Databases III, 9–10 Feb., 1995, San Jose, Calif. This reference also is incorporated herein by reference.

One method of impressing a digital watermark is given by G. Caronni, in "Assuring Ownership Rights for Digital Images," Proc. Reliable IT Systems, VIS '95, 1995, edited by H. H. Bruggemann and W. Gerhardt-Hackl (Vieweg Publ. Co.: Germany). Another method is given by I. J. Cox, J. Kilian, T. Leighton, and T. Shamoon in "Secure Spread Spectrum Watermarking for Multimedia," NEC Research Inst. Tech. Report 95–10, 1995. These references also are incorporated herein by reference.

Unlike the checksum or digital signature that calculate a measure of the original data, digital watermarking techniques modify the data in order to encode a known signature that can be recovered. The presence of the hidden signature in received data verifies that the data are unchanged, or its absence reveals that the data were modified from the watermarked form. The method of Cox et al (1995) supra is designed specifically for digital images, and it is sufficiently robust to survive even transformations of the digital data to analog form. However, all the above methods proposed for digital watermarking generally detect modifications by means of an external signature, i.e., no metric that measures the fidelity of the original digital data is used. Consequently, there exists no ability to measure in any detail the extent of the changes made or to estimate the precision of the received data. The steganographic watermarking methods differ from the digital signature and checksum methods primarily by being invisible, and by using the digital data to convey the watermark, thus eliminating the need for an appended value.

A robust, new method for validating digital data is taught by the present invention. Information needed to verify digital data is conveyed in the nearly adiabatic modifications to the digital data. The modifications consist of manipulation the digital data in a manner similar to the disclosures in copending U.S. patent application Ser. No. 08/392,642, filed Feb. 23, 1995, for DATA EMBEDDING.

Data validation as disclosed in the present invention hides data-metric quantities in the host digital data that measure the fidelity of the digital data. The data-metric values are incorporated into the data set by means of the data embedding method as disclosed in the above described copending application.

It is therefore an object of the present invention to provide apparatus and method for validating the data in a digital information stream without significantly changing the digital information.

It is another object of the present invention to provide apparatus and method for thwarting unauthorized access to the validation information that is embedded in normal digital data.

It is another object of the present invention to provide apparatus and method for constructing data-metrics from the digital data and a digital key, the data-metrics being constructed to convey the information necessary to verify the authentication of the digital data either completely, or in part.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

To achieve the foregoing and other objects, and in accordance with the purposes of the present invention, as embodied and broadly described herein, there is provided a method of validating digital data values comprising the steps of calculating first data-metrics that measure the digital data values completely, or in parts; authenticating the digital data in the form of revisions made by data embedding methods to represent the digital data-metrics by means of modifications to the digital data values; calculating second data-metrics for the digital data values after the digital data values are transmitted, archived, or opened to unauthorized modification; constructing an independent version of the first data-metrics for the digital data values after the digital data values are transmitted, archived, or opened to unauthorized modification by means of constructing the first data-metrics using the data embedding methods; comparing the calculated second data-metric with the constructed independent version of the first data-metric to determine locations and amount of modifications or changes to the digital data values; and outputting the locations and amount of modifications to the digital data values as verification quantities to a data port or file.

In another aspect of the present invention, and in accordance with its objects and purposes there is provided apparatus for authenticating digital data values that can be serialized to a sequence of individual digital-data element values comprising data authentication means receiving the individual digital-data element values in an ordered sequence for calculating data-metrics and embedding pair candidate values and for outputting the data-metrics and the embedding pair candidate values. Data embedding means receive the data metrics, the embedding pair candidate values and the individual digital-data element values in an ordered sequence for embedding the data metrics and the embedding pair candidate values into the individual digital-data element values in an ordered sequence and outputting authenticated digital-data values.

In yet another aspect of the present invention, and in accordance with its objects and purposes, there is provided apparatus for constructing data-metrics from a key-pair table embedded into individual frames of digital-data values presented in sequence comprising data metric construction means receiving the key-pair table and the individual frames of digital-data values and outputting a bitstream corresponding to a first data-metric embedded into the individual frames of digital-data values. Data-metric means receive the individual frames of digital-data values for calculating a second data-metric and outputting the second data-metric. Data verification means receive the bitstream corresponding to the first data-metric and the second data metric for comparing the first data metric with the second data-metric and presenting the results of the comparison to an output port.

BRIEF DESCRIPTION OF THE DRAWINGS

The accompanying drawings, which are incorporated in and form a part of the specification, illustrate the embodiments of the present invention and, together with the description, serve to explain the principles of the invention.

In the drawings:

FIGS. 5A and 5B are a listing of computer code in the C-language used to generate digital data for a test example of the present invention.

FIGS. 10A–10H are a partial listing of computer code in the C++language used for determining digital-data pairs and multiple values, or clusters, as members of an embedding key.

FIGS. 13A and 13B is a listing of the C++-language class definition of a data validation object.

DETAILED DESCRIPTION

The present invention allows data-metrics to be embedded into digital data without naturally discernible alteration of the content and meaning of the digital data. This is made possible through the use of the data embedding technique in the present invention, in which data embedding, as taught in the aforementioned copending "Data Embedding" application, is performed in a sequence that permits constructing a data-metric by parts.

Figure 1:
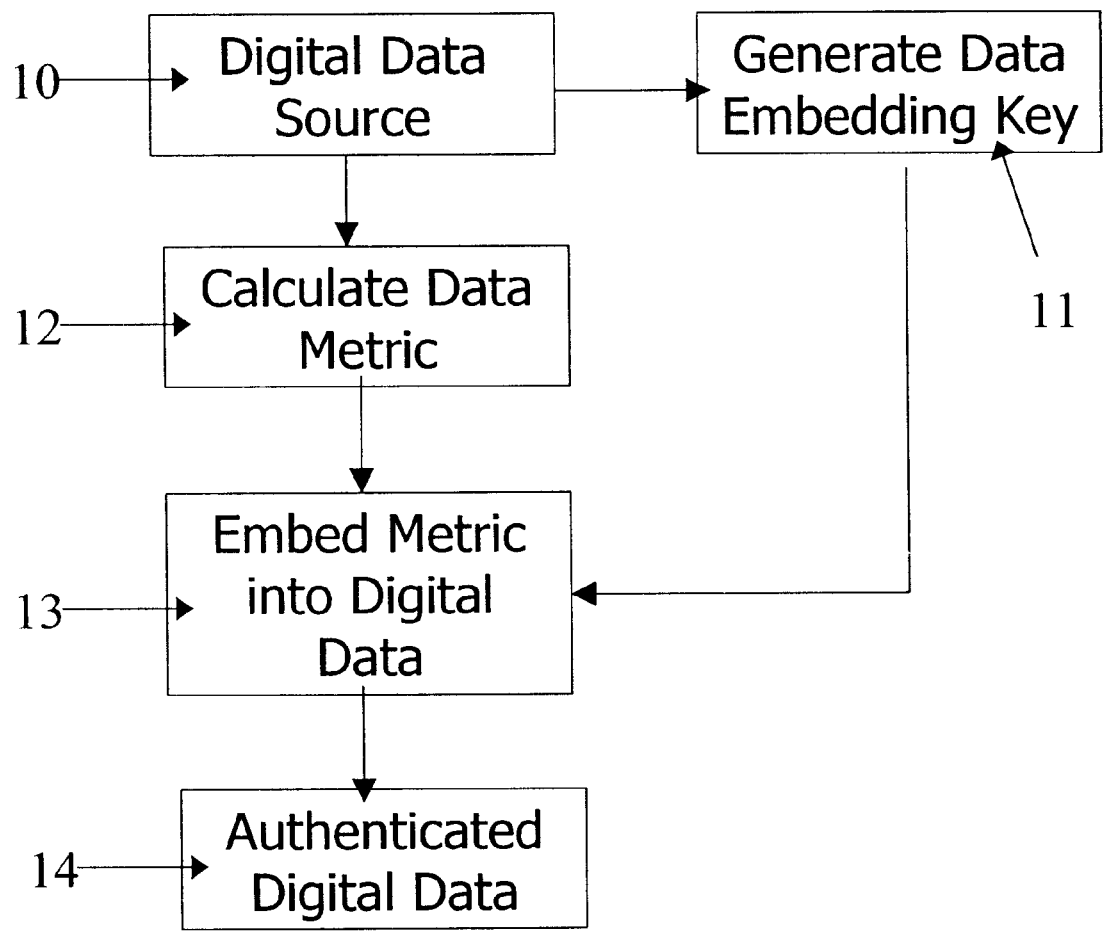
FIG. 1 is a block diagram illustrating the data validation process.

Data to be transmitted or archived are authenticated by the invention as illustrated in FIG. 1. The invention processes the digital data 10 to calculate data-metric values 12. The invention analyzes digital data 10 to determine key-pairs and key-tables 11 for use with the aforementioned "Data Embedding" application, which is used by the present invention to embed data-metric values 12 into digital data 10 in step 13. The digital data are thereby authenticated in step 14, and they can be verified at a future time, by a person authorized with the data embedding key-pair and key-table values.

Figure 2:
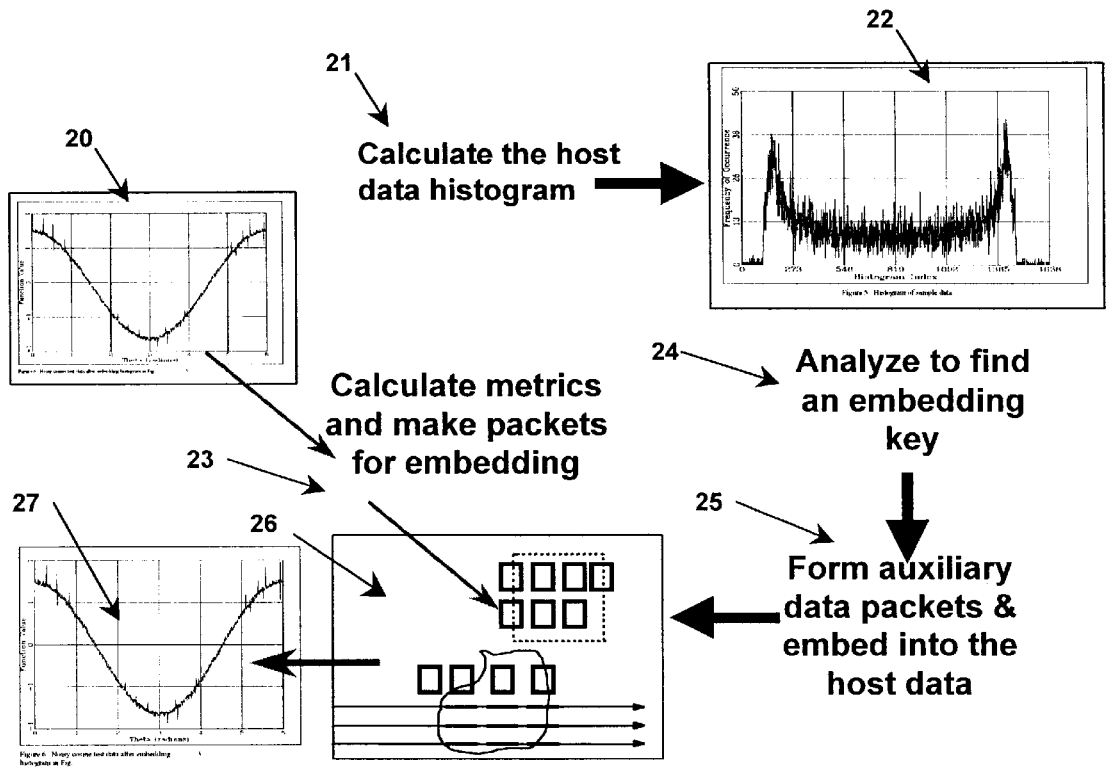
FIG. 2 is a block diagram illustrating the data authentication step.

The digital data example given herein is a sequence of floating point decimal values 20 in FIG. 2. The histogram data-metric is calculated 21 to produce a graph of the frequency of occurrence versus the floating-point value, in bins 22. The histogram data-metric is analyzed in step 24 to determine embedding key-air and key-table values, and the histogram data-metric is formed into auxiliary data packets 25 that can be embedded into the original digital data. In one embodiment of the present invention, the digital data-metrics are calculated and formed into auxiliary data packets separately from the histogram in step 23. The embedding method distributes the packets into tiles or sequences of the digital data in step 26. The resulting authenticated digital data 27 contains an embedded data-metric characterizing the original data, without the data-metric presence being readily discernible.

Figure 3:
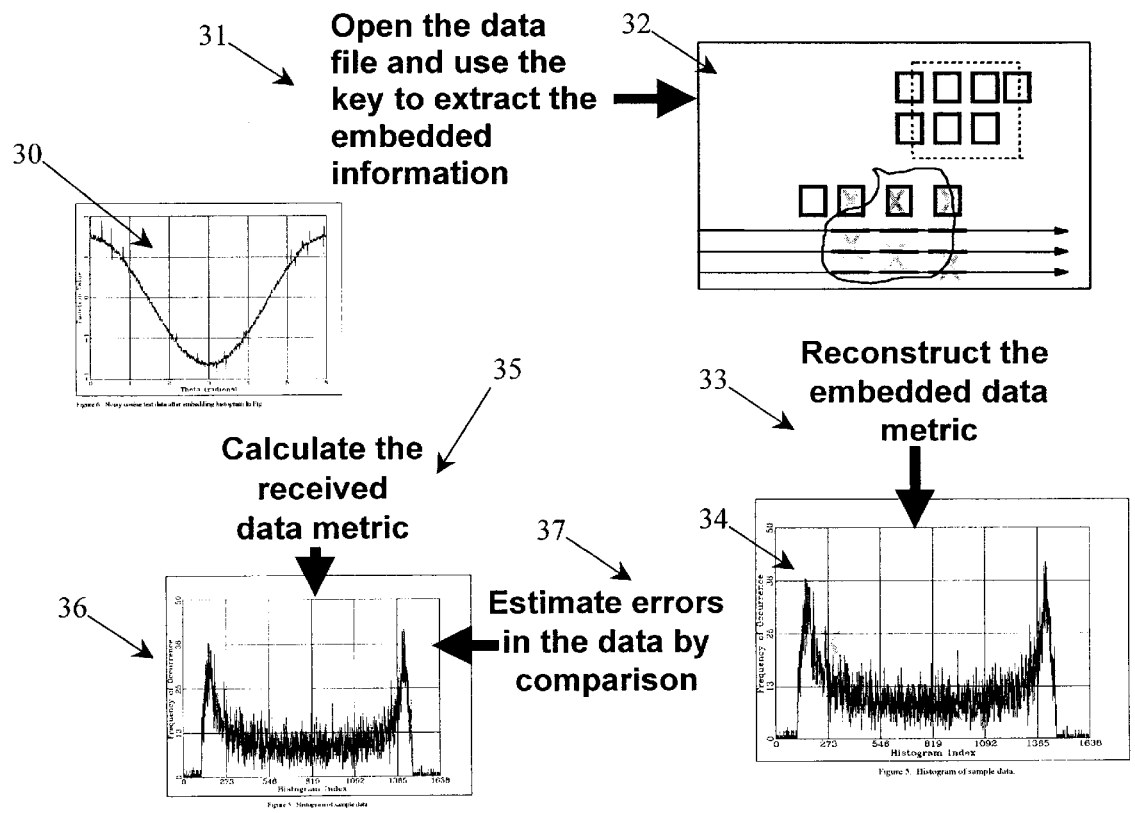
FIG. 3 is a block diagram illustrating the data verification process.

The process for verifying digital data 30 that are received from transmission, retrieved from an archive, or opened to any unauthorized modification is shown in FIG. 3. A person authorized to verify the data has in possession the key-pair and key-table values 31 used for data embedding. Auxiliary data packets containing portions of the data-metrics are constructed using the embedding key-values. The packets that fail to construct properly in step 32 indicate directly the regions of data modification or corruption. The constructed auxiliary-packet data permit reconstruction of the data-metric 33, except for the portions that were modified or corrupted (34). The data-metric is calculated directly in step 35 from the received data 30. The calculated data-metric 36 is compared with the data-metric that is constructed from the embedding key-values 34 and the amount of error is estimated in step 37.

In the example, for authentication with the histogram data-metric, the histogram of the digital data is embedded into the digital data values. Other suitable data-metric quantities are validation sums for blocks of the data, or the deviation from the average of data values within a block or sequence of values. The invention requires that data-metric quantities are embedded adiabatically into the data, in order to provide the means to verify that the data are unchanged to within the known error introduced by the data embedding process.

Conventional steganography modifies the original data more than does the data embedding technique. For examples of conventional steganography, see the aforementioned article by W. Bender, D. Gruhl, and N. Morimoto 1995, "Techniques for Data Hiding." The significant, often large change in the digital data made by conventional steganography obscures the digital data-metric of the transmitted or archived information, thereby preventing verification of the host data.

Figure 4:
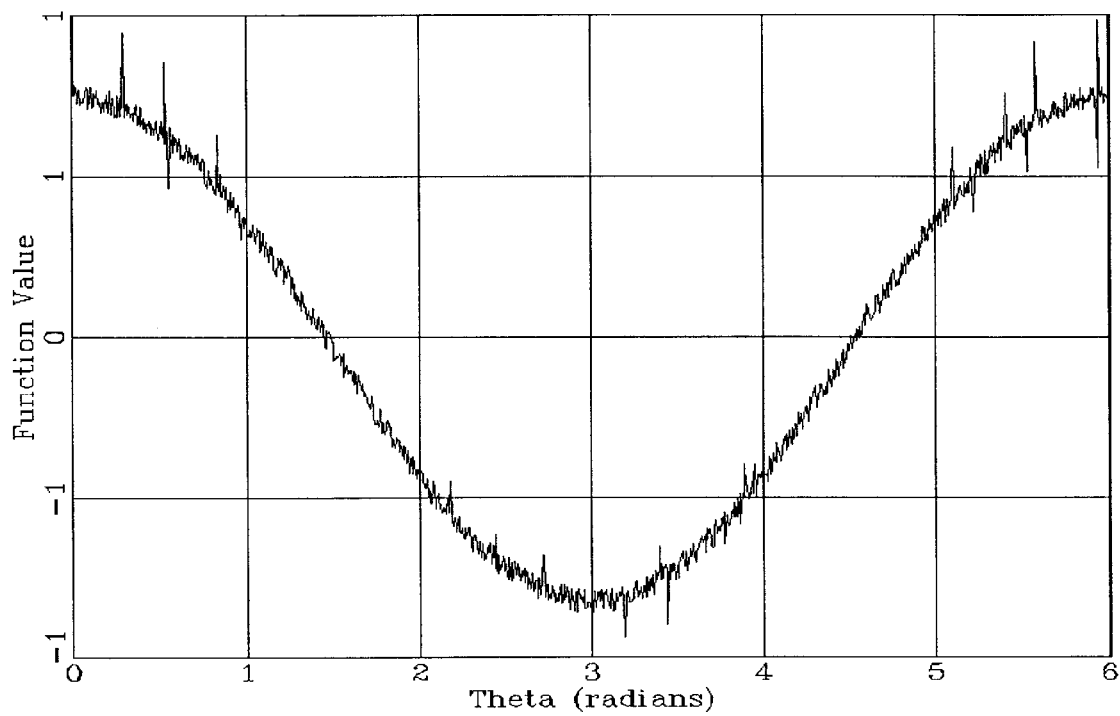
FIG. 4 is a graph of the digital data used for testing.

In the present example, the data values are floating point numbers that represent a cosine function containing both white and spike noise. FIG. 4 shows a graph of the test data. FIG. 5 shows a listing of the C++language computer program that generates the test data. The histogram of the digital data shown in FIG. 6 graphs the fiequency of occurrence of any value versus its value. For the example, the original-data histogram is used as a single data-metric.

Figure 6:
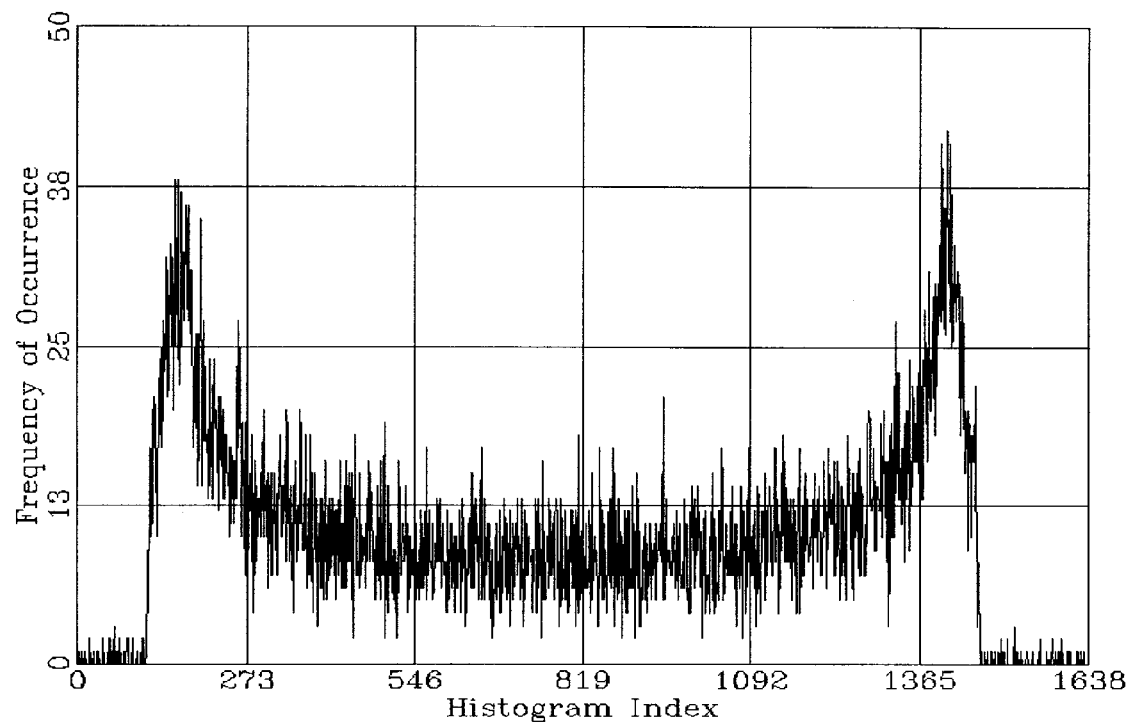
FIG. 6 is a graph of the histogram data-metric for the test data used in the example.

The histogram abscissa in FIG. 6 is the digital-data value coordinate, and the ordinate is the frequency of occurrence of the values. An abscissa value corresponds with the digital data values falling within a specified, decimal histogram interval. The histogram ordinate value is the total number of data values found in the abscissa interval. Thus, the histogram, when normalized to unit area is the probability density for selecting a randomly drawn value from the data.

The histogram-metric validates digital data by comparing the constructed histogram with the histogram calculated for the received or retrieved data. Data embedding modifies the digital data values at most by one abscissa interval, for pair embedding, and by several intervals, for table embedding. Therefore, data embedding as taught in the aforementioned copending "Data Embedding" application guarantees that the histogram ordinate values change by less than a specified percentage.

After the embedding process, the histogram ordinate value corresponding to key-pair or key-table digital-data values differs from the original histogram-ordinate value by less than a known amount. Any differences in the digital-data values larger than the known amount indicate that modification or corruption of the digital data has occurred.

Moreover, the histogram difference owing to data embedding modification of the digital data is statistically consistent with the original histogram. The statistical constraint on the fiequency of occurrence of the key-pair and key-table values that is inherent in the data embedding method permits using statistical comparisons of the histogram-metric to verify the received digital data.

Consider floating point digital data having numerical values in the interval 0.0 to 1.0. Assume the histogram abscissa interval is 0.01, or one percentage of the data range. If the original data value 0.53256 changes to 0.53166, the amount of change (0.0090) is less than the histogram interval. Thus, the data value change is insignificant for verification with the histogram metric, because it does not modify the histogram frequency of occurrence. Consequently, for this example, the data for a key-pair embedding method are verifiable to within about 1% of the maximum value.

If the digital data value in the example changes to 0.52000, the amount of change (0.01256) is larger than the abscissa interval. The change causes the frequency of occurrence for one abscissa value to decrease, and the frequency to increase for an adjacent histogram interval. If the histogram abscissa values are members of the embedding key-table, then the change could occur as a result of applying the data embedding algorithm. In this case, for the data to be verified to within 1%, the total histogram ordinate values corresponding to embedding-key abscissa values must agree to within the embedding constraint.

If the histogram abscissa value is not a key-pair or key-table value, or the histogram ordinate difference exceeds the embedding constraint, then the received or retrieved digital data value is different from the original value. Hence, the amount and number of changes can be estimated. Histogram metric verification for embedding with key-pair values detects in detail the changes in digital data values that are not embedding-key members. Digital data values used as key-pair values guarantee changes within twice the histogram interval. Statistically, the digital data are verifiable to within one histogram interval, or 1% in this example. Comparison of the computed and constructed histogram leads to a statistical estimate of the likely number and magnitude of changes made to the original data.

The digital-data values authenticated by use as elements in an embedding key-table suffer greater changes than for digital-data values used as key-pairs. For a cluster of four digital data values used in an embedding key-table, the histogram-ordinate values, i.e., the frequency of occurrence, corresponding with the table entries are approximately equal. Thus, the invalidation of digital data values equal to the key-table values is certain, when the calculated histogram ordinate values differ from the constructed ordinate values by more than the embedding constraint. For histogram ordinate, i.e., frequency of occurrence values falling within the constraint, the digital data validate to within the size of the table in units of the histogram interval, or 4% for the example.

In one embodiment of the present invention, the digital data-metric can be the average for a set of consecutive data values. For floating point data, compute the average for a number M, of consecutive digital data values. The number M of values contributing to the average is the number of data values required to contain the embedded data-metric, for example 32-bits, the size of a value having the float data type.

For verification in the embodiment, each constructed data-metric quantity is compared with the corresponding value calculated from the digital data under examination. If the sum of the received M digital data values agrees with the embedded sum to within the error introduced by the embedding algorithm, then the data are verified. For random bits embedded, data embedding changes the digital data values uniformly, and the M-average calculated metric value agrees closely with the metric average calculated from the original digital data.

The data-metric values can be embedded with the key-table method described by M. T. Sandford, T. G. Handel, and J. M. Ettinger in "Data Embedding in Degenerate Hosts," Los Alamos National Laboratory Report LA-95-4446UR, December 1995 (incorporated herein by reference). For a key-table containing four values, two bits per digital data value are embedded. Thus, at least M=16 host values are needed to embed the 32-bit float-type average.

Figure 7:
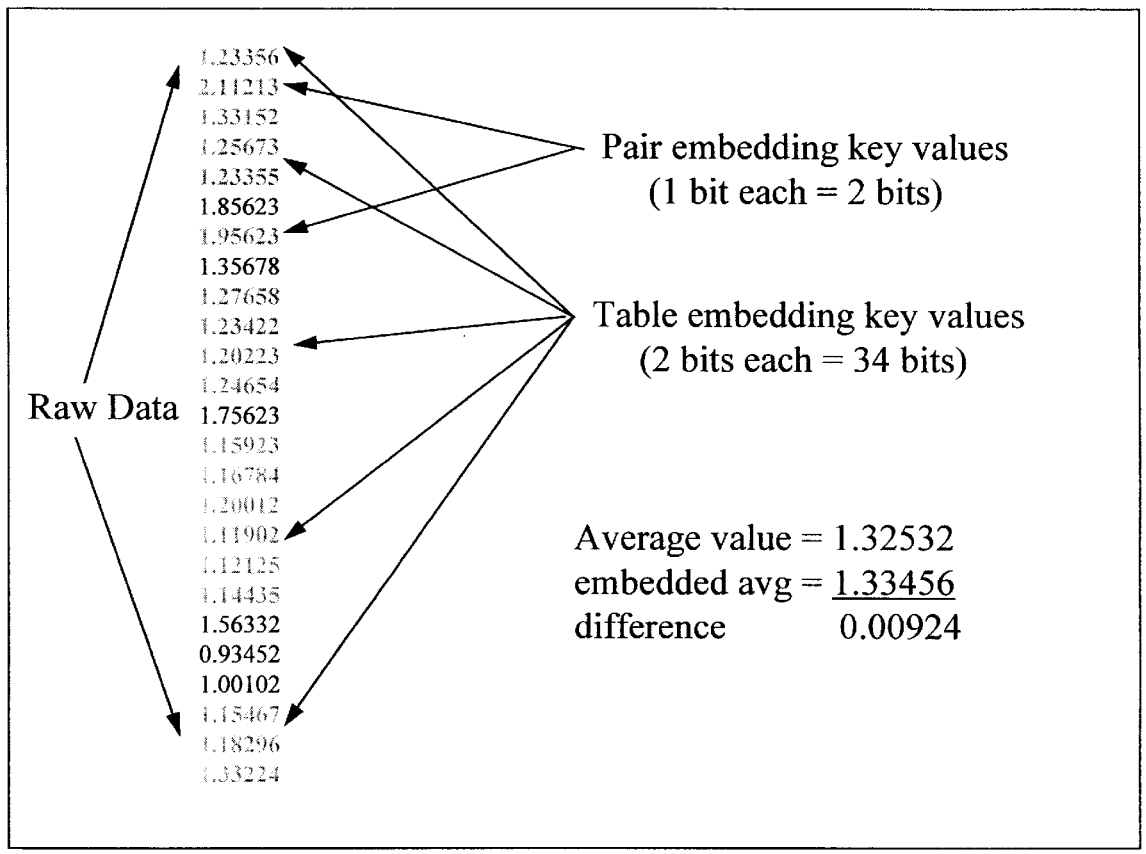
FIG. 7 is a diagram illustrating the data embedding method for a sequence of floating point digital data values.

FIG. 7 shows a portion of floating point data authenticated with an embedded average-value data-metric. The embedded data-metric is the average of a consecutive sequence of host data values. One embodiment of the present invention processes the digital data sequentially, and determines the number of data values that are required to embed the combination of a "magic number," an arbitrarily chosen binary number used to identify start of a data-metric, and a single 32-bit float-type data average. Assuming a 4-bit magic number, and 32-bits of a floating-point average value, 36 bits of auxiliary data must be embedded.

The run of twenty-five data values shown in FIG. 7 provides 36 bits of embedding space. In the left column of raw digital data values in FIG. 7, seventeen are identified as members of 4-element embedding key-tables that embed two bits for each value. Two data values are members of an embedding key-pair that embeds one bit each.

The data-metric, i.e., the average calculated for the twenty-five values in FIG. 7 is 1.32532. The embedded data-metric value, i.e., the average of the original twenty-five values before embedding is 1.33456. The difference is 0.6 percentage of the average, and the comparison therefore verifies the example data to within one percent.

Different data-metrics are possible as well, in other embodiments of the invention. For example, the variance from the average can be calculated, embedded, and compared with the variance calculated for the received data. The variance gives greater sensitivity to changes in the data ordering than does the average value.

A potential disadvantage of the embodiment of the present invention that uses the average-value data-metric, in comparison with the histogram data-metric, is the inability to detect reordering of the data. However, the data embedding construction process detects reordering of the digital data. Exchanging elements within the data, or modifying their values corrupts the embedded quantity. Even the magic number that identifies the data-metric could be corrupted by manipulations of the data. Significant changes to the digital data values invalidate the construction processing of the entire block. Therefore, data reordering is detected easily by the present invention.

Like encryption, the data validation method automatically verifies digital-data by means of a successful construction of the hidden metrics. Digital data corrupted in transmission, or modified by an unauthorized person cannot be processed to construct the data-metric values, because the bit sequence of the auxiliary data depends upon sequencing of the digital data values. Even a single digital-data value changed from a key-pair value to any value not in use as a member of the key-pair stops the packet construction process. Likewise, changing a data value from a key-pair value to a key-table value desynchronizes the packet construction algorithm.

However, any digital-data values that are not part of the embedding-key sequence can be modified, removed, or added without affecting the data-metric construction process. Modifications of non-key digital-data values are detected by comparing the constructed data-metric with the metric calculated from the digital data.

Verifying digital-data by means of data embedding applied to the present invention therefore requires embedding the data-metric values with an algorithm that is robust against corruption of the digital-data. Consider an embedding algorithm that processes the digital-data sequentially, starting at the beginning of the data and working towards the end. In the simplest form, the data-metric forms a single-unit constructed by processing the digital data, with the embedding key, from its beginning to the end. However, any data-metric constructed following a corrupted element of the host data are incorrect. Hence, a single-unit scheme is not useful for validating the content of the digital-data.

The data embedding process, as described in the aforementioned copending "Data Embedding" application, is modified by the present invention to partition embedding into the digital-data, and to divide the data-metric that measures the data fidelity into independent blocks.

The aforementioned copending "Data Embedding" application applied to fax embedding divides the auxiliary data into packets, each containing a sequence number and a checksum. If the extraction of a particular packet fails, because of fax digital-data corruption, the data for other packets are unaffected. Hence, the presence of corrupted pixels in the fax digital-data, i.e., the black and white fax image, affects only part of the data. The concept of embedding data according to blocks, or packets, extends to a more general case in this invention.

In a fax image, transmission errors typically cause data-dropouts that degrade part, or all, of a pixel row. The fax transmission protocol synchronizes the start of pixel rows to preserve the readability of the fax document. In the aforementioned pending application, the fax-data embedding process synchronizes to the start of the rows of pixels in the image, in order to provide a means for the extraction process to recover from corrupted host data. Synchronized embedding ensures that the start of a data packet signals when it decodes from the image. A process similar to that used by the well-known XMODEM data transmission protocol is used.

For fax bitmaps, a start of a packet is identified by a pixel line containing the first black pixel in an even-numbered column. Lines with pixels starting in odd-numbered columns are 'continuation' lines. Continuation lines contain data contributing to the construction of the packet that began earlier, on a starting line of pixels. If a packet-starting line appears when a continuation line is expected, then the packet is corrupted and its data are not constructed.

After constructing packet data, the checksum validates its content. Auxiliary data decoded from the packet move to the auxiliary data stream. If a checksum test fails, the packet is corrupted, in either its sequence number, data, or checksum portion, and the packet content is suspect.

Data embedding employed for purposes of conveying data-metrics within the digital data employs a similar, packet embedding scheme. Moreover, the embedding algorithm must consider the nature of the likely corruption of the host data. If the host data change extensively, for example by inverting the data or by a non-linear transformation, then the corruption is so large that verification probably is not possible.

However, if the corruption is partial, for example a few random changes or the loss of a segment of the digital data, then an embedding algorithm using packets can recover some data. A few data-metric values may be sufficient to identify and verify the unchanged parts of the digital data, and to characterize the corruption.

Figure 8:
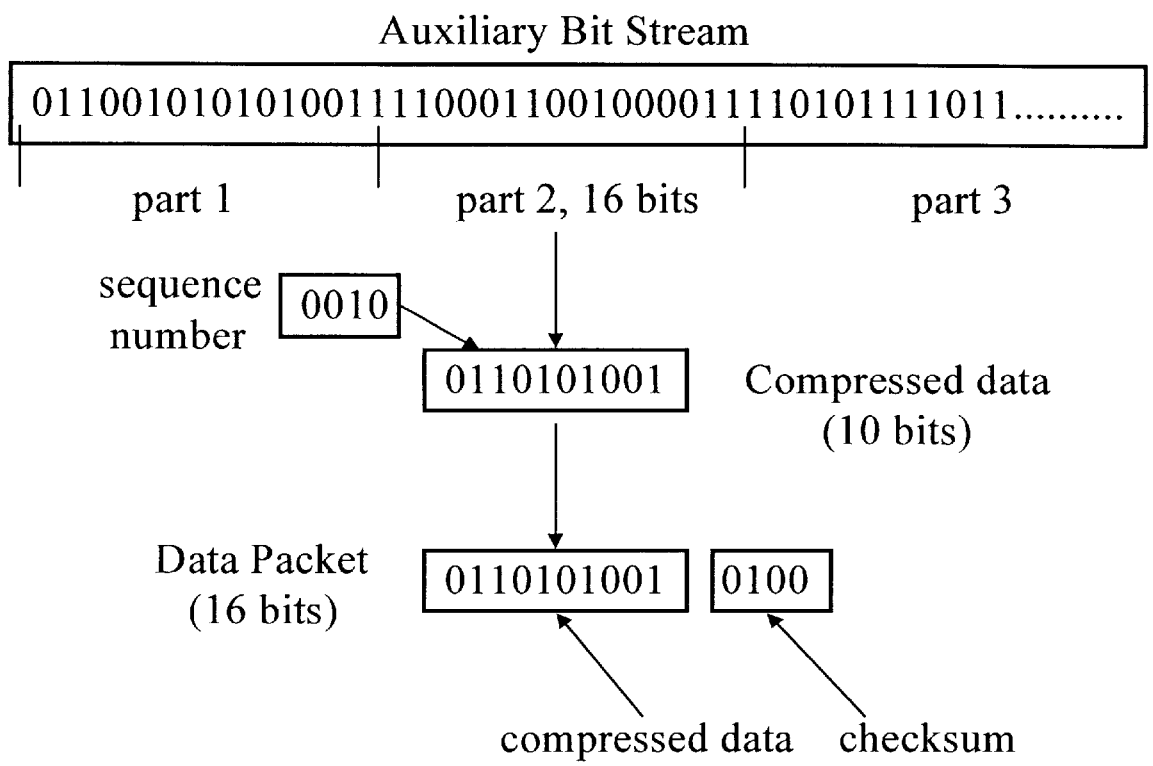
FIG. 8 is a diagram illustrating a method for dividing the digital data-metric into information packets.

FIG. 8 illustrates one way to process digital-data into packets. The digital-data-metric bit stream separates into parts, shown as 16-bit segments in the illustration. For the example, the auxiliary data-metric bit stream consists of the digital-data histogram values, and any additional values that might be required for validation purposes. Each part of the data-metric is processed according to the flow shown in FIG. 8. Compressed digital data cannot be decompressed if any portion is incorrect, so it is preferable to divide the data-metric into parts, compress each data-metric part, encode the portion into packet format, and embed each packet separately.

A packet sequence number concatenates with the digital-data, and the result is compressed, using a loss-less algorithm, to 10 bits in this example. In practice, a larger packet size is needed for compression to work efficiently. A data packet is created by calculating a checksum value for the compressed digital-data and combining it into a single bit sequence (16 bits, in this example). The sequence number is present only to facilitate the correct identification and placement of the packets into the extracted bit stream.

The embedding algorithm constructing the largest amount of correct auxiliary data depends on the kind of host data corruption that is likely to occur. For fax images, noise in the transmission is usually a data dropout that corrupts perhaps a few lines of pixels. One or more packets of the auxiliary data are lost, because several lines of pixels define the packet size.

The embedding algorithm used in the present invention should synchronize the packets with the digital data in a fashion that minimizes the number of lost packets. For the fax application, embedding with an algorithm that disperses the packet data randomly across the host data-space would be a poor choice, because a sequence of corrupted host-data values would affect several embedded data packets. A scheme embedding packets sequentially is robust against corruption that occurs in sequence, for example dropouts that occur during transmission of the digital data.

An alternative embedding method distributes the data-metric into two-dimensional 'tiles.' Images and data that have meaning in more than one dimension are more robust when the embedded data-metric packets distribute into an area. A digital image for example is manipulated with tools that operate on specified portions of the image. Hence, corruption in the image tends to be spatial rather than sequential.

Figure 9:
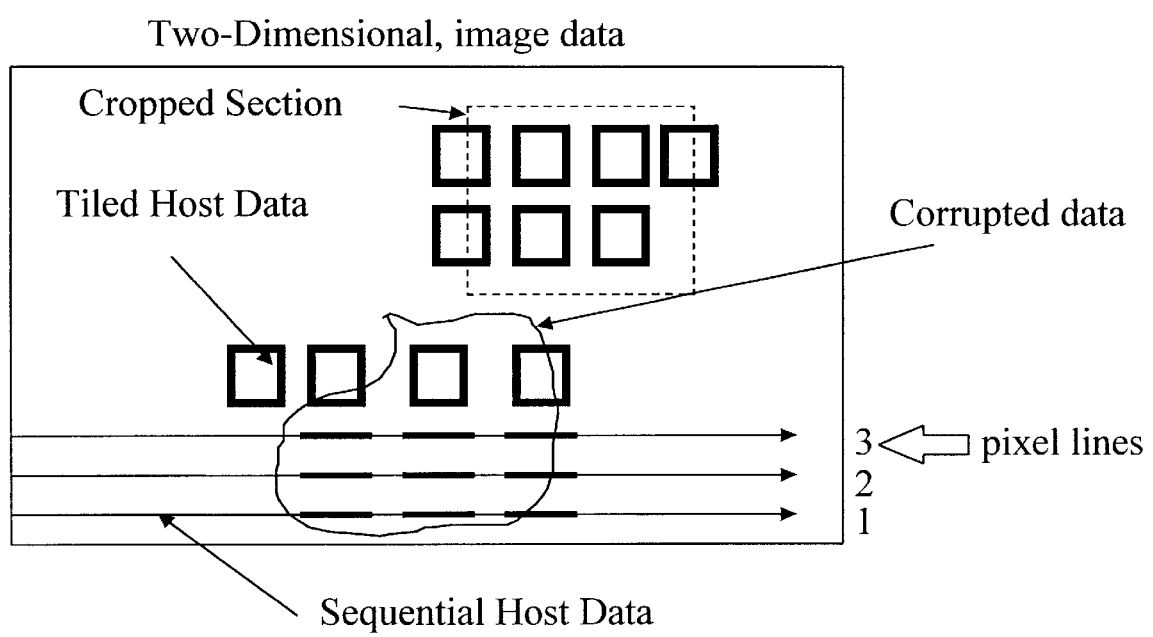
FIG. 9 is a diagram illustrating methods for distributing the embedded data-metric into the digital data.

FIG. 9 illustrates embedding packet data in sequence for linear digital-data, and according to tiles for spatial data. In the image shown schematically in FIG. 9, sequential embedding moves across the rows of pixels, moving from the first pixel line upward. Heavy line segments indicate where runs of host data values are used to embed packet information. In practice, the number of pixels needed to embed a packet varies, because the frequency of occurrence of pixels within the key-values varies within the host data.

The heavy rectangles in FIG. 9 show the host pixels used by a tiled embedding algorithm. Each two-dimensional tile of host data holds one data-metric packet. The irregular shaded region is the type of spatially correlated corruption that is the most likely for image data.

In the two-dimensional pixel space, a tiled embedding algorithm reduces the effect of image corruption, in comparison with a sequential embedding algorithm. A tiled-packet method is more robust than a random or sequential embedding method, for randomly changed host data values, because a number of random changed values falling within a tile affects only one packet. However, for many random changes, neither sequential nor tiled embedding is likely to be very robust against corruption of the embedded data.

The present invention applies the aforementioned copending "Data Embedding" application to embedding auxiliary information into floating-point host data, for example the data shown in FIG. 4. The data in FIG. 4 show one cycle of the cosine function, degraded with white and spike noise. White noise is added to each point, with amplitude ±0.05. Spike noise is present with 5% frequency, with ±0.30 amplitude. Thus, the sample data in FIG. 4 contain random, or white, and spike noise components, simulating data typical of sensor values recorded as floating-point numbers. The number of sample data values is M=16,383.

The histogram of the floating point values $f_i$, (i=1,2,3, . . . M) defines a unique embedding key. FIG. 6 shows the histogram of the sample floating point data shown in FIG. 4. The arbitrary histogram size is 10% of the number of floating point values. Therefore, for the sample data in FIG. 4, the histogram in FIG. 6 contains N=1638 entries.

The size of an interval in the histogram shown in FIG. 6 is $\epsilon=\Delta/N$, where $\Delta=f_{max}-f_{min}$ is the range of the floating-point data values. In FIG. 6, the histogram is sparse for the lowest and highest intervals, because only the largest and smallest data spikes contribute to those samples. The histogram is symmetric, and it contains two peaks. The peaks represent the most frequent values in the sample data, that occur at values where the data approach the limits ±1. Between the peaks of maximum frequency in FIG. 6, the frequency of occurrence of the data values is noisy, and approximately uniform owing to the white noise in the digital data.

In the embedding method taught in the aforementioned "Data Embedding" application, one embeds auxiliary data using pairs and clusters of sample values chosen by applying constraints to the histogram. Reasonable selection constraints are 10% for the frequency of occurrence, and a data value range of eight histogram intervals. The constraints force the host data pairs and members of the embedding tables to fall within a range of $8\epsilon$, but the values are not necessarily consecutive, or adjacent to one another. Table 1 gives the parameters for the data in FIGS. 4 and 6.

TABLE 1

| Sample Data Parameters | |
|---|---|
| $F_{min}$, min. data value | −1.22421 |
| $F_{max}$, max. data value | 1.32080 |
| $\epsilon$, histogram interval | 0.00155373 |
| $8\epsilon$, embedding histogram range | 0.0124298 |

In order to create the embedding key, the present invention processes the sample data values sequentially, from their beginning to end. For each data value, the integer histogram interval index is calculated, and tested against other values falling within the constraints on interval range ($8\epsilon$), and frequency of occurrence (equal to within 10%). In addition, a maximum cluster size of four values, corresponding to two embedding bits, is permitted. For the sample data in FIG. 4, the embedding-key selection algorithm finds 154 pairs and 129 tables. The C++language computer code that selects the pairs and tables is shown in FIG. 10.

Embedding auxiliary data-metrics into the floating-point values is identical in principle with the method taught in the aforementioned "Data Embedding" application. The details for embedding differ because the floating-point values falling within the histogram interval generally differ from one another, whereas the integer values used for digital images define the histogram abscissa coordinate. An example serves to illustrate the difference.

In FIG. 7, consider the two data values identified as members of an embedding-key pair. The values in FIG. 7 are examples for illustration purposes, and they do not correspond to data in FIGS. 4 and 6. Two values are 1.95623 and 2.11213. If one assumes the histogram interval is $\epsilon=0.01$ for this example, and that the data begin with a minimum value of 0.00000, then the histogram interval indices for the two values are i=195 and j=211, respectively. For embedding purposes, any host value falling within the interval 1.95000–1.95999 represents an embedded 0-bit, and any value falling within the interval 2.11000–2.11999 represents an embedded 1-bit.

As the embedding code processes the host data, suppose it is necessary to embed a 0-bit, and assume further the digital-data value 1.95763 is encountered. Because this value falls within the histogram interval corresponding with a 0-bit, no change is necessary, and the embedding process moves to the next auxiliary bit. Suppose this bit is also a 0-bit.

If the next digital-data value encountered is 2.11565, a value within the range representing a 1-bit, then it must be changed to a value falling within the range representing a 0-bit. Changing the digital-data value creates a new data value within the proper histogram interval. The original data value is h=2.11565, then the new value is $$h'=s(i+\gamma), \qquad 1)$$

where $\gamma$ is a random number uniform in the unit interval. Therefore, data embedding for floating point values differs from the integer implementation, because new data values are created. However, the values created are constrained by the embedding-key values, in order to guarantee that the new values follow the original digital-data histogram.

The first requirement of a verification algorithm is the construction of the embedded data-metric. The embedding key must be available. It is assumed that the correct, uncorrupted key is known, and that the data containing the embedded information are obtained through channels admitting the possibility of data corruption.

Figure 11:
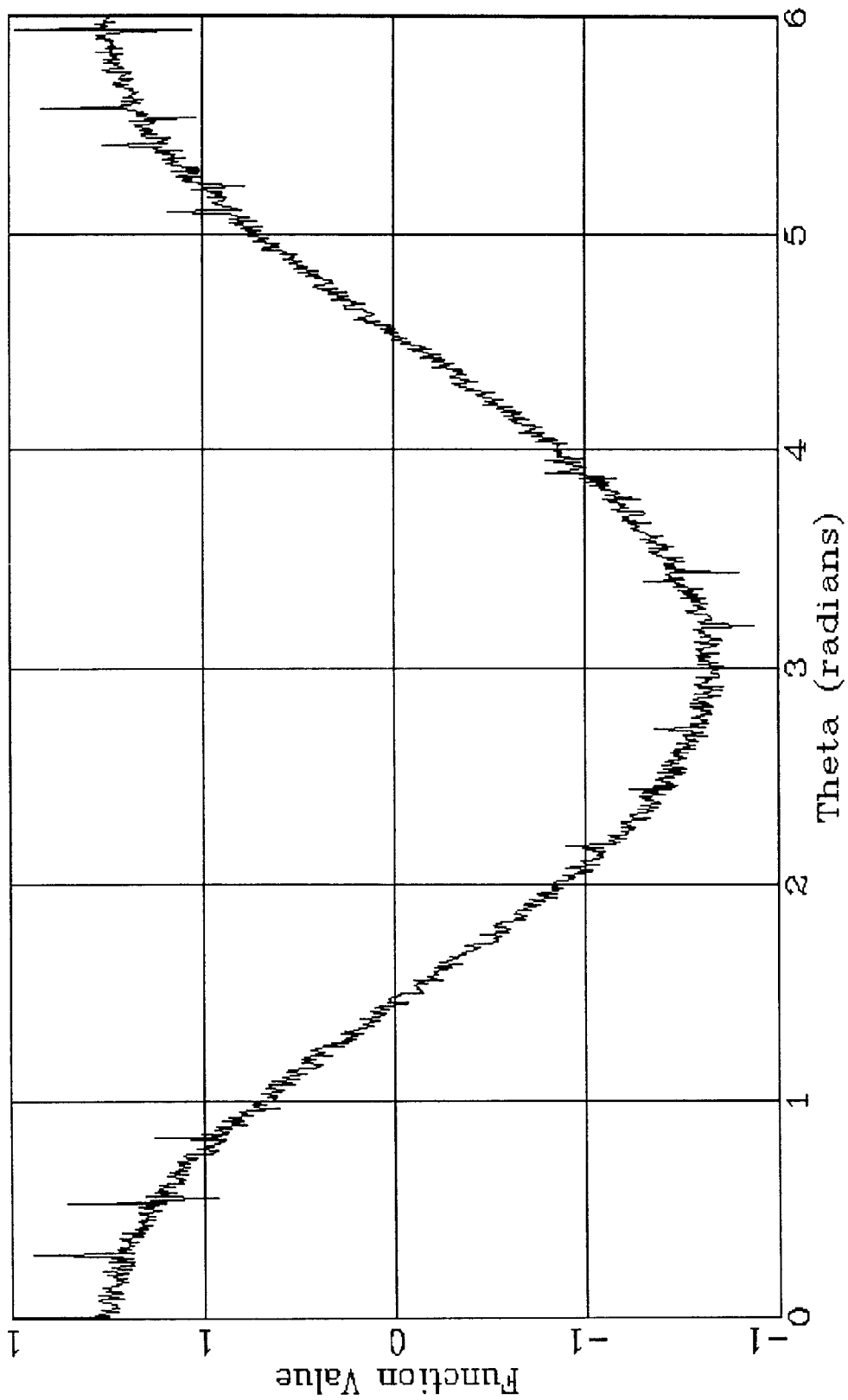
FIG. 11 is a graph of the digital data containing the histogram data-metric after processing with key-pair and key-table embedding.
Figure 12:
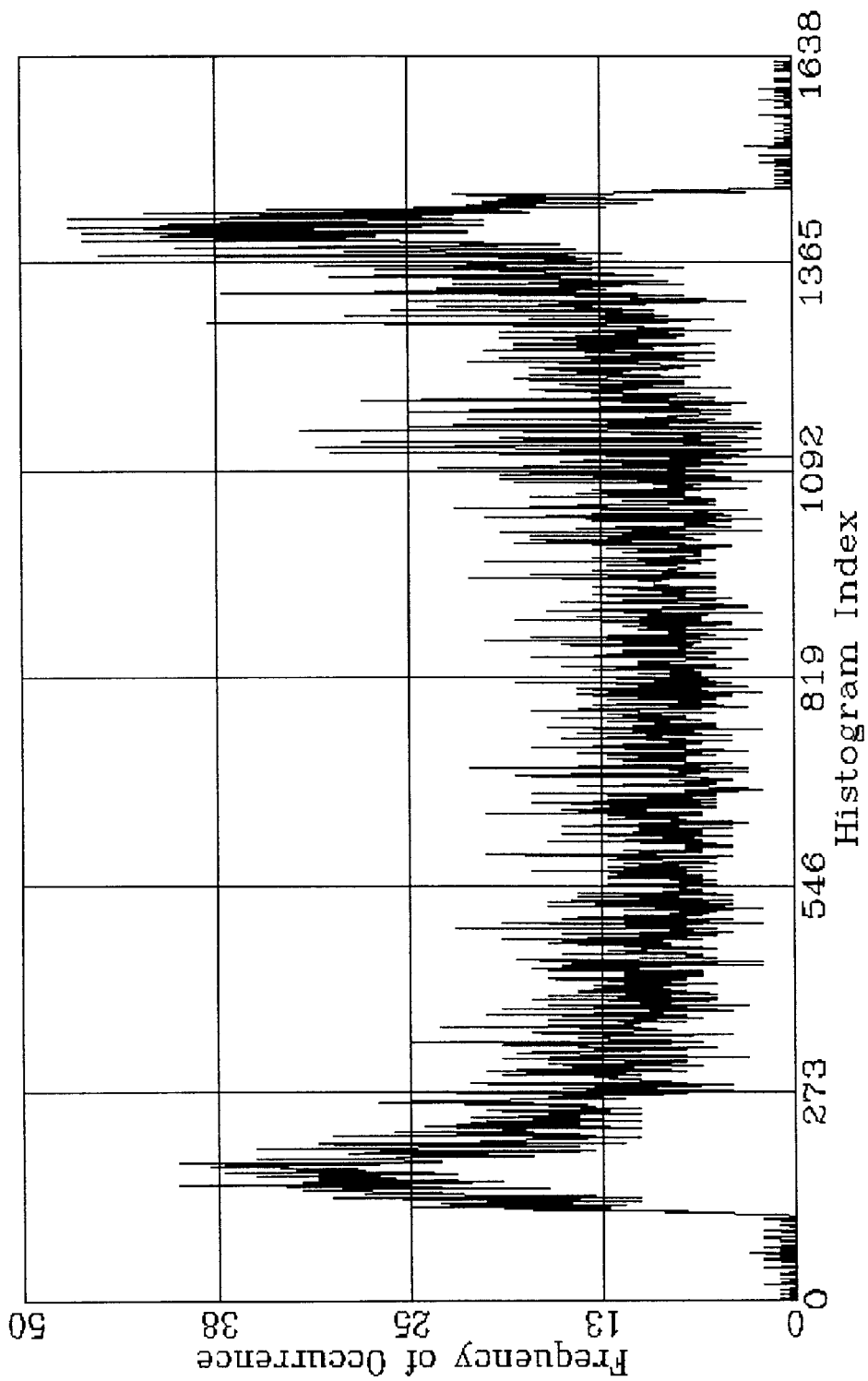
FIG. 12 is a graph of the histogram of the digital data containing the histogram data-metric.

Assume the histogram-metric is constructed correctly. The verification process consists of comparing the histogram of the data received with the original histogram. The two differ; owing to the embedding process that modified the host data values. To illustrate the magnitude of the difference, compare the sample data after embedding the histogram-metric shown in FIG. 6 with the original data shown in FIG. 4. The histogram-metric in FIG. 6 was compressed with the PKZIP® algorithm before embedding into the digital data shown in FIG. 4. FIG. 11 shows the digital data containing the embedded histogram metric. FIG. 12 shows the histogram for the data in FIG. 11.

As expected, FIGS. 4 and 11 appear similar. Comparing the respective histograms in FIGS. 6 and 12 reveals differences due entirely to the embedding invention. In particular, the noise in FIG. 12, in the interval between histogram index 273 and 1365, is greater owing to the randomization in equation (1) above. Details of the peaks at the left and right sides of the histograms differ as well. The extreme left and right parts, i.e. the histogram of the noise spike components, are unchanged because the embedding algorithm constraint avoids these values.

In this example, verifying the received data consists of applying an algorithm to compare the two histograms. Statistical methods measure the correlation between the extracted, original histogram and the histogram of the data received. The correlation length is the value interval represented by the histogram constraints that select the embedding-key values, $8\epsilon$ for the sample data. Data received without any modifications verify easily with a statistical comparison.

Verifying embedded information from a corrupted host presents a significant challenge, because the corruption affects the construction of the embedded data-metric information. Most likely, part of the data-metric information is lost, and cannot be constructed. The effect of corruption in the received data e.g. changes in the data as illustrated in FIG. 3, leads to missing portions of the extracted histogram. Thus at the time of verification, the original histogram will be known piecewise, rather than complete, as shown in FIG. 6.

The locations of packets corrupted by data changes in the sequence of host data values, or by data changes within tiles reveal directly the locations of the data corruption. The received data (see step 30, FIG. 3) can be divided into sections to identify the parts known to contain corrupt information. The failure of an embedded packet to construct correctly does not necessarily mean that all the information contributing to its extraction process is invalid. Only one changed value can invalidate the sequence number or checksum of an embedded packet.

For the example data, a test for validity is still possible if the extracted histogram is largely intact. The histogram of the received data are calculated and compared with the histogram fragments that are extracted, in order to set a measure to the validity of the received data.

Embedding the histogram metric into floating-point digital data is supported by a C++language data validation class. FIG. 13 contains the C++object definition listing. The Cvalidate:: class is designed to facilitate embedding the histogram into a file containing floating point numbers. The class is derived from the CDataFile:: class, which is part of the data embedding class architecture defined and implemented by M. T. Sandford in "A Data Embedding Class Architecture," Los Alamos National Laboratory report LA-CP-96-151, Mar. 29, 1996 (incorporated herein by reference). The public members of the data validation object are methods for individual use to calculate and embed the histogram.

The constructor function Cvalidate(short Data_Type, short Data_Mode, LPSTR lpFname), accepts three arguments. The Data_Type specifies the kind of data to be validated. For the present example, only floating point data are supported and the Data_Type variable is DATA_TYPE_FLOAT. The Data_Mode variable specifies the operation requested of the class. Two possible modes are VALIDATE and XVERIFY, to calculate and embed the histogram, and to extract and verify it, respectively. The third argument is a string identifying the path and file name for the host data.

The class processes the digital data file with the virtual routine named MakeFloatTable(). The routine provided in the class implementation reads 32-bit floating-point numbers from a binary data file. The routine is virtual, in order for the user of the class to provide customized code to read and process data in a different format. The MakeFloatTable() routine is capable of processing 16,382 values in the 16-bit Windows® Ver. 3.1 implementation. Larger files can be processed by building the class for the 32-bit architecture Windows® 95 and Windows® NT systems.

The output of the class constructor is a data file named output.bin. The file is written in the same format as the original, input file of host data. The output.bin file contains the host data authenticated with the embedded, compressed histogram.

For the Data_Mode parameter equal to XVERIFY, the file named in the third argument is processed to extract and decompress the embedded histogram and to call a virtual routine CompareHistograms(). The other public function members of the class are summarized in Table 2.

TABLE 2

Validation Class Member Functions

| Member Routine | Description |
| --- | --- |
| MakeHistogram(void) | Calculates the histogram of the floating point data |
| MakeHistTables(void) | Analyzes the histogram to identify pair and table values for the embedding key |
| EmbedFloatValues (lpDataFile, lpOutFile) | Embeds the data file into the floating point values, and creates the ouput file |
| EmbedFloatPairs (*fvalue,k,*maxval) | Embeds one bit into the a floating pt. Value |
| EmbedFloatTables (*fvalue,cndx,*maxval) | Embeds multiple bits into a floating pt. Value |
| MakeIndexTable(void) | Constructs a look-up table for data extraction |
| ExtractFloatValues(lpKeyFile) | Extracts data from fl. pt. Values using a key |
| ExtractFloatPairs (*fvalue,k,*maxval) | Extracts a bit from a floating point value |
| ExtractFloatTables (*fvalue,cndx,*maxval) | Extracts multiple bits from a fl. pt. Value |
| CompareHistograms(void) | Compares data histograms to verify data |

Figure 14:
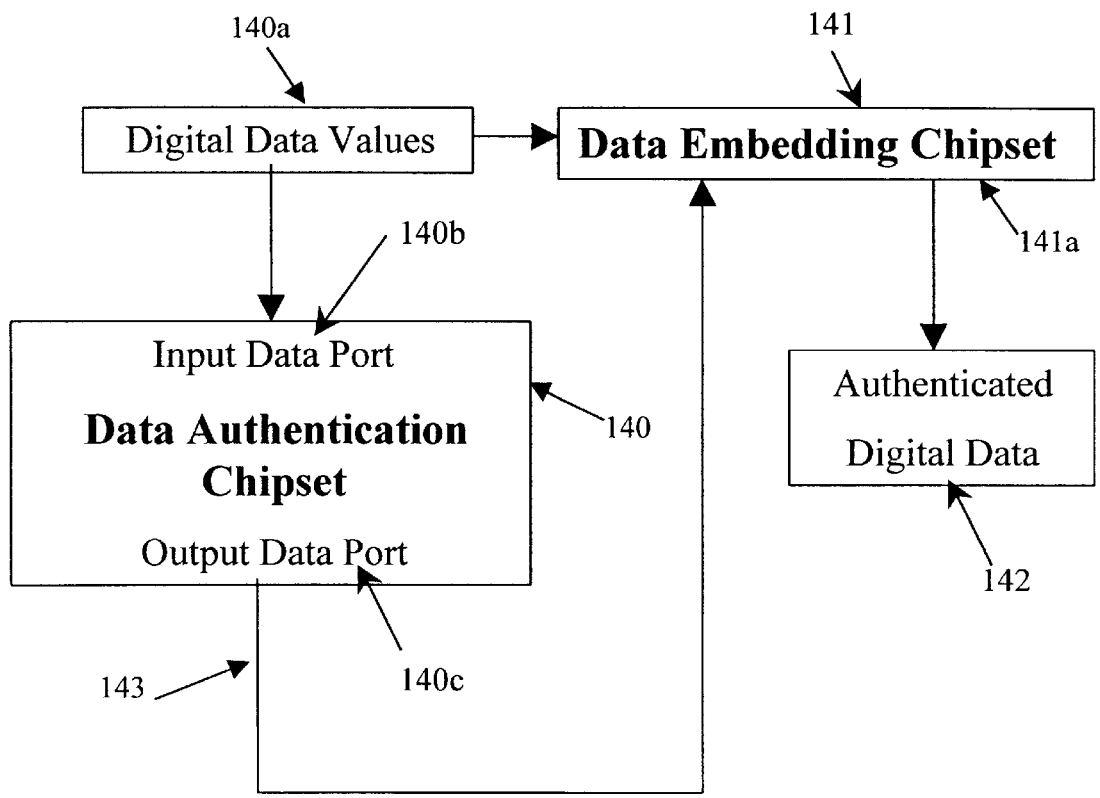
FIG. 14 is a block diagram of chipset hardware for authenticating data from a host data stream.
Figure 15:
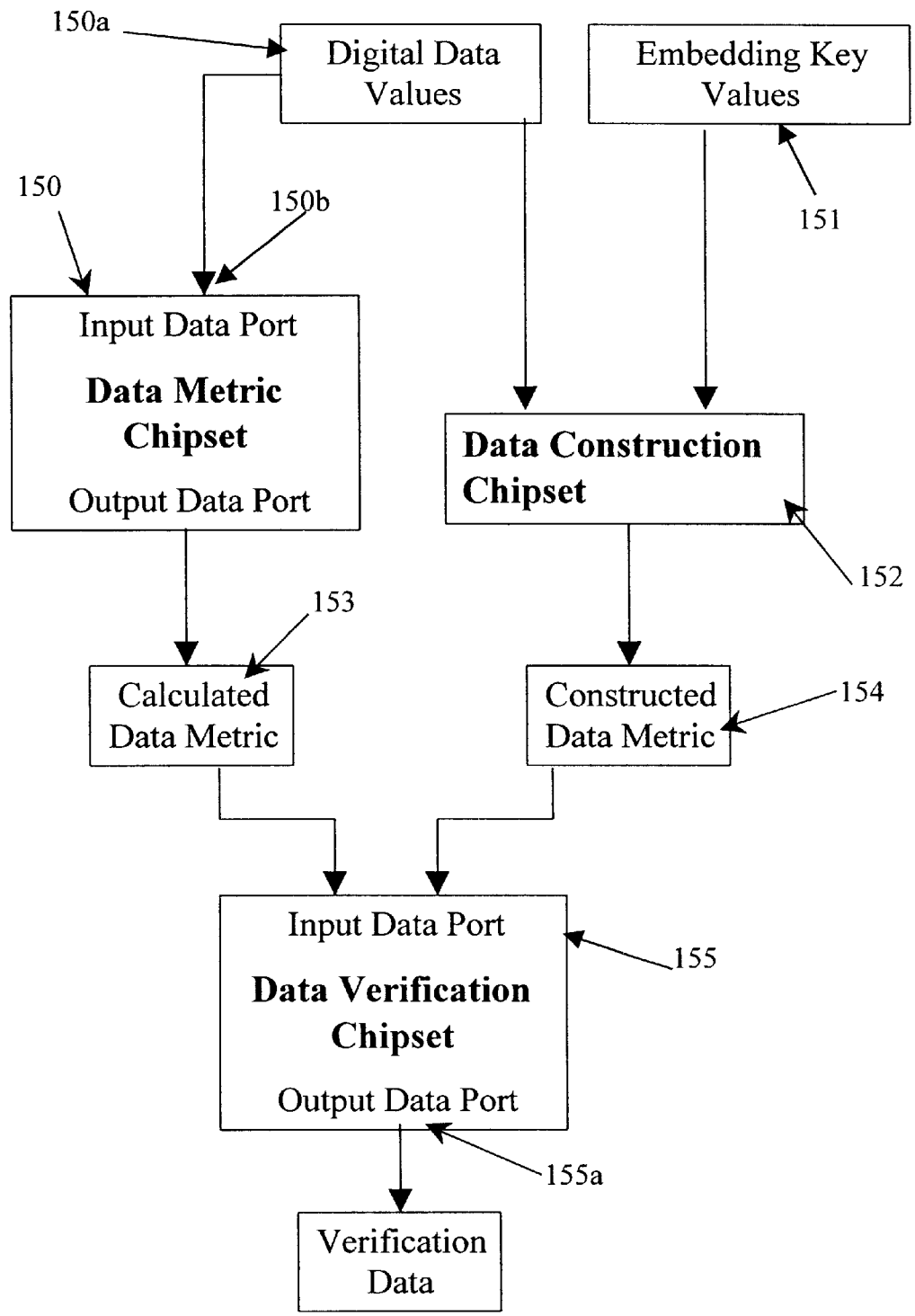
FIG. 15 is a block diagram of chipset hardware for constructing verifying digital data from an input data stream and a digital key.

The invention is implemented in hardware by processing pixel data as is shown in FIGS. 14 and 15. In FIG. 14, digital data 140a enter data authentication chipset 140 through an input port 140b. Digital-data 140a also pass to a data embedding chipset 141 for processing to determine key-pair and key-table values. Data authorization chipset 140 calculates data-metric quantities 143 and makes them available at output port 140c that is connected to data embedding chipset 141. Authenticated data containing embedded metrics pass from output port 141a of data embedding chipset 141 to archival storage, or to a communication line for transmission 142.

In FIG. 15, digital data 150a received from communications or retrieved from archival storage are presented to data-metric chipset 150 at input port 150b. Embedding-key values 151 are provided separately to data construction chipset 152 and permit the authorized user to implement the data construction algorithm with data construction chipset 152. Calculated data-metric values 153 are calculated from digital-data values 150a on input port 150b. The calculated data-metrics 153 are compared with the constructed data-metrics 154 in data verification chipset 155, and the result of the comparison is made available at data verification chipset output port 155a. Digital-data appearing at input port 150b are thereby verified, and the result made available for further processing.

The present invention is broadly applicable to many fields which employ digital methods for the transfer of records. Among these applications are in the transfer of physiological, biological and health records, of data generated from sensors, of diagnostic records relating to disease, aging or injury, of records relating to environmental monitoring or measurement, of measurements relating to forensic analysis, including records relating to evidence and litigation, and of digital multimedia information.

The foregoing description of the preferred embodiments of the invention has been presented for purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A method of validating digital data values comprising the steps of:

calculating first data-metrics that measure said digital data values completely, or in parts;

authenticating said digital data in the form of revisions made by data embedding methods to represent said digital data-metrics by means of modifications to said digital data values;

calculating second data-metrics for said digital data values after said digital data values are transmitted, archived, or opened to unauthorized modification;

constructing an independent version of said first data-metrics for said digital data values after said digital data values are transmitted, archived, or opened to unauthorized modification by means of constructing said first data-metrics using said data embedding methods;

comparing said calculated second data-metric with said constructed independent version of said first data-metric to determine locations and amount of modifications or changes to said digital data values; and outputting said locations and amount of modifications to said digital data values as verification quantities to a data port or file.

2. The method as described in claim 1 further comprising the step of combining said first data-metric with predetermined information indicative of separation of said first data-metric into packets containing a sequence number, a checksum, and a portion of said data-metric.

3. The method as described in claim 2 further comprising the step of compressing said first data-metric packet prior to embedding said first data-metric packet into said digital data values.

4. The method as described in claim 1 of embedding said first data-metrics in said digital-data values according to a specified sequence compatible with said data embedding methods in a linear or spatial distribution.

5. The method as described in claim 1, wherein said digital data values comprise integer data digitized from an analog sensor.

6. The method as described in claim 1, wherein said digital data values comprise floating-point data digitized from an analog sensor.

7. The method as described in claim 1, wherein said digital data values comprise digital data values presented to software or hardware from an unknown source.

8. The method as described in claim 1, wherein said digital data values relate to identification of individuals by means of physiological or bio-molecular measurements.

9. The method as described in claim 1, wherein said digital data values relate to the diagnosis of disease, aging, or injury.

10. The method as described in claim 1, wherein said digital data values comprise measurements made as records for environmental monitoring or measurement.

11. The method as described in claim 1, wherein said digital data values comprise measurements made or retained for purposes of a forensic analysis.

12. The method as described in claim 1, wherein said digital data values comprise measurements made as records used for purposes of litigation or evidence.

13. The method as described in claim 1, wherein said digital data values comprise digital multimedia information.

14. Apparatus for authenticating digital data values that can be serialized to a sequence of individual digital-data element values comprising:

data authentication means receiving said individual digital-data element values in an ordered sequence for calculating data-metrics and embedding pair-candidate values and for outputting said data-metrics and said embedding pair-candidate values;

data embedding means receiving said data-metrics, said embedding pair candidate values and said individual digital-data element values in an ordered sequence for embedding said data-metrics and said embedding pair candidate values into said individual digital-data element values in said ordered sequence and outputting authenticated digital-data values.

15. The apparatus as described in claim 14 wherein said data authentication means and said data embedding means are contained within a chipset.

16. The apparatus as described in claim 14 wherein said data authentication means and said data embedding means are implemented with discrete components in circuit board circuitry.

17. Apparatus for constructing data-metrics from a key-pair table embedded into individual frames of digital-data values presented in sequence comprising:

data-metric construction means receiving said key-pair table and said individual frames of digital-data values and outputting a bitstream corresponding to a first data-metric embedded into said individual frames of digital-data values;

data-metric means receiving said individual frames of digital data values for calculating a second data- metric and outputting said second data-metric;

data verification means receiving said bitstream corresponding to said first data-metric and said second data-metric for comparing said first data-metric with said second data-metric, and presenting said results of said comparison to an output port.

18. The apparatus as described in claim 17 wherein said data-metric construction means, said data-metric means and said data verification means are contained within a chipset.

19. The apparatus as described in claim 17 wherein said data-metric construction means, said data-metric means and said data verification means are implemented by discrete components in circuit board circuitry.

20. The apparatus as described in claim 17 wherein said data-metric construction means, said data-metric means and said data verification means are implemented in software or firmware programming.

* * * * *